United States Patent [19]

Sy, Jr.

[11] Patent Number: 5,131,177
[45] Date of Patent: Jul. 21, 1992

[54] APPARATUS FOR DISPLAYING A STICKER ON ANY SELECTED SURFACE THAT IS REMOVABLE FROM THAT SURFACE WITHOUT DAMAGE THERETO

[76] Inventor: Enrique M. Sy, Jr., 5533 Walnut Blossom Dr. #2, San Jose, Calif. 95123

[21] Appl. No.: 494,505

[22] Filed: Mar. 16, 1990

Related U.S. Application Data

[63] Continuation-in-part of Ser. No. 355,165, May 22, 1989, abandoned.

[51] Int. Cl.⁵ .................................................. G09F 21/04
[52] U.S. Cl. ................................... 40/593; 40/591; 40/597; 40/611; 40/651; 40/661
[58] Field of Search ............... 40/593, 591, 597, 611, 40/610, 606, 661, 124.1, 152.1, 649, 651, 618

[56] References Cited

U.S. PATENT DOCUMENTS

| | | | |
|---|---|---|---|
| 1,175,652 | 3/1916 | Marquette | 40/649 |
| 1,367,659 | 2/1921 | Hollis | 40/649 X |
| 1,583,720 | 5/1926 | Jacobs | 40/597 |
| 2,094,193 | 9/1937 | Summers | 40/651 |
| 2,165,595 | 7/1939 | Weinhart | 40/618 |
| 2,659,991 | 11/1953 | Strayer | 40/651 |
| 3,108,696 | 10/1963 | Winner | 40/124.1 X |
| 3,466,774 | 9/1969 | Borresen | 40/591 X |
| 3,973,341 | 8/1976 | Kent, Jr. | 40/124.1 |
| 4,187,630 | 2/1980 | Giulie et al. | 40/152 X |
| 4,226,040 | 10/1980 | Carroll et al. | 40/610 |
| 4,736,539 | 4/1988 | Dickinson | 40/591 |
| 4,745,695 | 5/1988 | Hetzer | 40/661 |
| 4,756,106 | 7/1988 | Foster | 40/591 |
| 4,796,045 | 5/1988 | Schweim | 40/661 X |

Primary Examiner—Laurie K. Cranmer
Assistant Examiner—Milton Nelson, Jr.
Attorney, Agent, or Firm—Phillips, Moore, Lempio & Finley

[57] ABSTRACT

A portable and reversible lightweight sticker display system is disclosed for stickers and the like. Each of the various embodiments includes a display board of various configurations each defining slots for capturing a support device along each side edge, and stiffening rods for high temperature and windy applications. In each embodiment the mounting devices can be reversed so that the display board can be mounted on the inside of a window so that the sticker is visible through the window or on the outside of a surface. Simply reverse the position of the display board and the suction cups to display a sticker on the other side of the display board. The sticker display system can also be utilized as a sun visor to cover the open area of the windshield of an automobile.

8 Claims, 4 Drawing Sheets

APPARATUS FOR DISPLAYING A STICKER ON ANY SELECTED SURFACE THAT IS REMOVABLE FROM THAT SURFACE WITHOUT DAMAGE THERETO

This is a continuation-in-part of copending application Ser. No. 07/355,165 filed on May 22, 1989, now abandoned.

BACKGROUND OF THE INVENTION

1. Field of the Invention

This invention relates to an apparatus for removably displaying stickers on a selected surface without damaging that surface or leaving an adhesive residue. More specifically, it relates to a portable and reversible sticker display apparatus.

2. Description of the Prior Art

Society today has fallen in love with stickers. You see them everywhere, on everything, with every possible message. Some of the bumper stickers are political in nature with many of these usually of interest for only the duration of a political campaign; many are seasonal in nature and only of interest in that season; and the others are generally advertising or convey novelty messages. No matter what the sticker says it has a useful life that is measured by either the length of time that the message is of interest or the actual life of the sticker when it is exposed to the elements. When that time comes the only thing that can be done is to obliterate the sticker or leave it in place. Neither choice is satisfactory since you always end up with the adhesive glob from the sticker remaining on the surface in the shape of the sticker, and the adhesive has gotten soft and you can not place something else over it because it will not stick. These stickers are not only used on every surface of our vehicles, they are also used in our homes on walls, on doors and on mirrors from which their removal presents the same problems as does their removal from the surfaces of our vehicles.

While there are various designs for portable signs known in the art, what is not known is a light weight, easily installed mounting system that can be used to mount a sticker on any surface, including the interior surface of a window of a vehicle on a hot day that will not sag, distort and fall off the surface. The present invention provides such a mounting system.

SUMMARY OF THE INVENTION

In accordance with the preferred embodiments of the present invention there is disclosed a sticker display system for temporary attachment to a surface on which or through which one or more stickers are to be displayed. In each of those embodiments the system includes display board means of a lightweight material geometrically sized and shaped to be at least as large as the sticker to be displayed for receiving a sticker for display with slots defined along it vertical geometric edges. There is also a pair of temporary mounting means for supporting the display board means when mated with said slots in the display board means and affixed to the surface where the sticker is to be displayed. The final element in each embodiment is stiffening means that are applied to the display board means for providing stiffening to the display board means in situations where it would otherwise be subject to sagging, twisting or warping.

DESCRIPTION OF THE PREFERRED EMBODIMENTS

Figure 1:
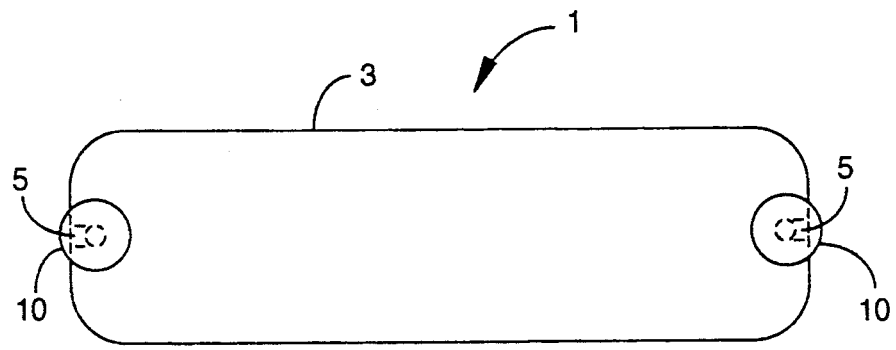
FIG. 1 is a plan view of an assembled sticker mounting system of one embodiment of the present invention.
Figure 2:
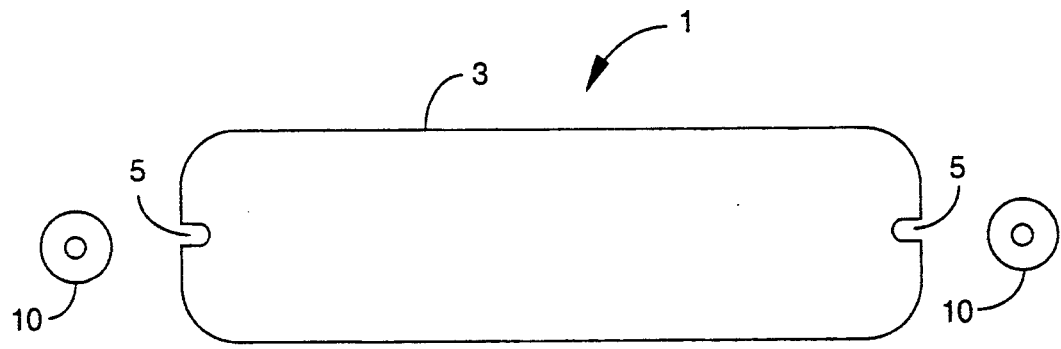
FIG. 2 is an exploded plan view of the sticker mounting system of FIG. 1.

FIGS. 1 and 2 show a first embodiment of a sticker mounting system 1 of the present invention. The system includes a display board 3 having slots 5 centrally located along the shorter vertical edges of the display board 3, and a pair of suction cups 10, one each to be inserted into and to be captured by slots 5. It is to be noted that display board 3 is shown as rectangular in these figures, however, that shape was selected for illustration since most stickers are rectangular in shape. Each of the various designs of the present invention could just as easily be made into any desired shape.

Figure 3:
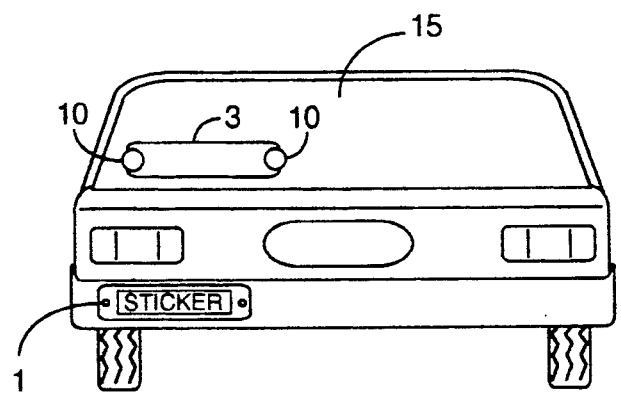
FIG. 3 is a rear view of an automobile with two sticker mounting systems of the present invention shown mounted thereon.

To use this device one would affix the sticker to be displayed to the surface of display board 3 between the suction cups and then press suction cups 10 onto the surface on which the sticker is to be displayed. This configuration therefore allows the user to insert suction cups 10 facing the same surface as the sticker for mounting the sticker on the inside of a window (see FIG. 3 rear window), or facing the other side of display board 3 for mounting the display board on the outside of a surface (see FIG. 3 bumper). Alternatively, a second sticker could be placed on the other side of display board 3 so that the message being displayed could easily be changed.

Figure 4:
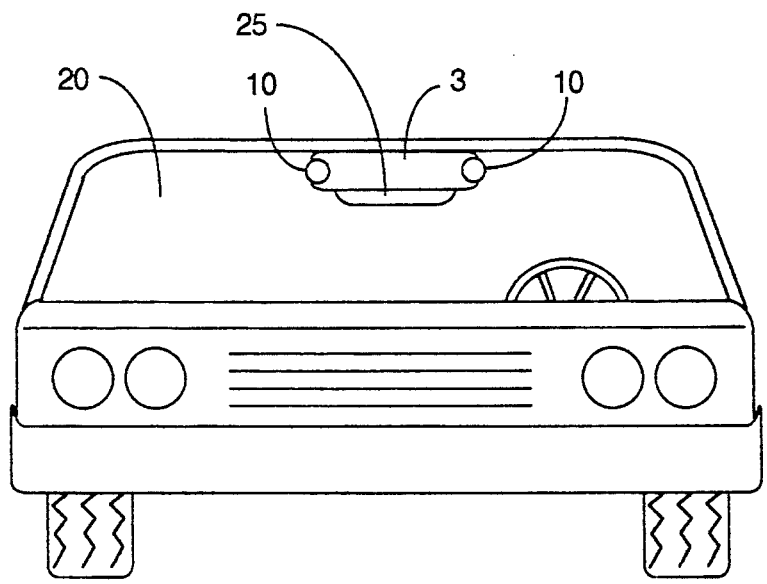
FIG. 4 is a front view of an automobile with a sticker mounting system of the present invention shown mounted above the rear view mirror of the vehicle.

FIG. 4 shows an alternative use for the sticker mounting system of the present invention. In this view display board 3 is shown mounted on the inside of windshield 20 of an automobile at the top center in front of rear view mirror 25. This is suggested since in some automobiles the standard sun visors do not cover that portion of the windshield which in some driving situations may make driving uncomfortable and dangerous. For this purpose display board 3 may be a clear tinted material without having a sticker mounted thereon, or it may be opaque if it would not block the driver's vision.

Figure 5:
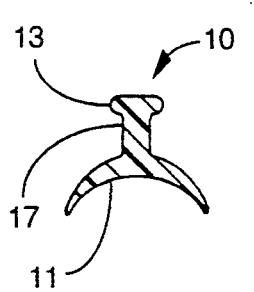
FIG. 5 is a cross sectional view of one of the suction cups used in the sticker mounting systems of the present invention.

FIG. 5 is a cross-sectional view of suction cup 10 showing cup portion 11, cap portion 13, and shaft portion 17 of a flexible plastic suction cup 10. As discussed above, it is shaft portion 17 that is captured by slots 5.

Figure 6A:
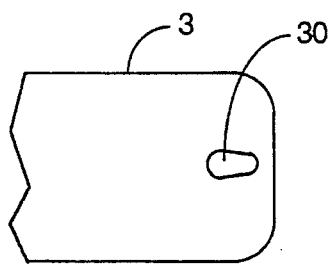
FIGS. 6a-d each illustrate a different slot shape for attaching the suction cups to display board portion of the sticker mounting system of the present invention.
Figure 6B:
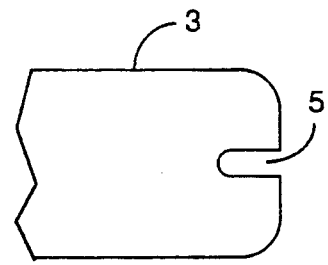
Figure 6C:
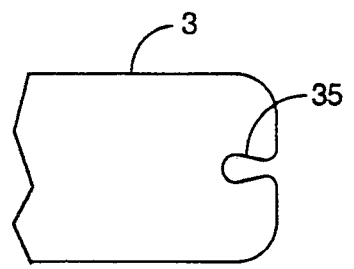
Figure 6D:
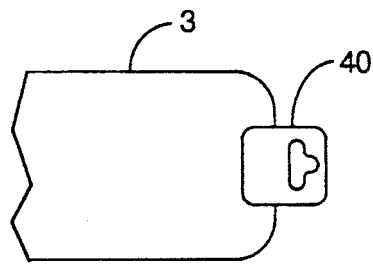

FIGS. 6a-d show several, but not all possible slot configurations. Slot 5 in FIG. 6b, that was discussed above, is a simple straight sided slot with an open end. In FIG. 6a there is shown a simple straight sided slot 30 without an open end. FIG. 6c shows a round slot 35 that is open to the edge along a small portion of the circumference of the circle. Finally, in FIG. 6d a tab 40 is shown affixed to one side of display board 3 with a "T" shaped slot defined by tab 40. In each case of the closed end slots, cap 13 of suction cup 10 is manipulated through the slot so that cap 13 is on one side of display board 3 and cup 11 on the other with shaft 17 captured by the slot. In the open end slot configurations, shaft 17 is inserted through the open end of the slot and is captured within the slot when fully inserted.

Figure 7:
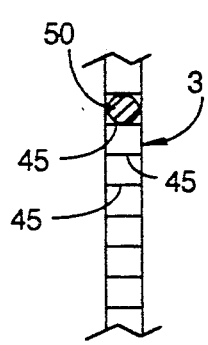
FIG. 7 is a partial end view of one possible material for use as the display board of the present invention with a strengthening rod in place.

To lighten the weight of the sticker display assembly and allow the use of smaller suction cups 10, display board 3 can be manufactured from various plastics or paper through the use of corrugation or fluting of the selected material. Doing so, however, results in display board 3 loosing rigidity when used in direct sun light and in enclosed spaced that are heated by the sun. FIG. 7 shows a partial end view of a display board 3 that was cut from a fluted or corrugated material with its internal flutes or corrugations 45 running substantially parallel to the edges of display board 3 that will represent the top and bottom edges of the sticker to be displayed.

Figure 8:
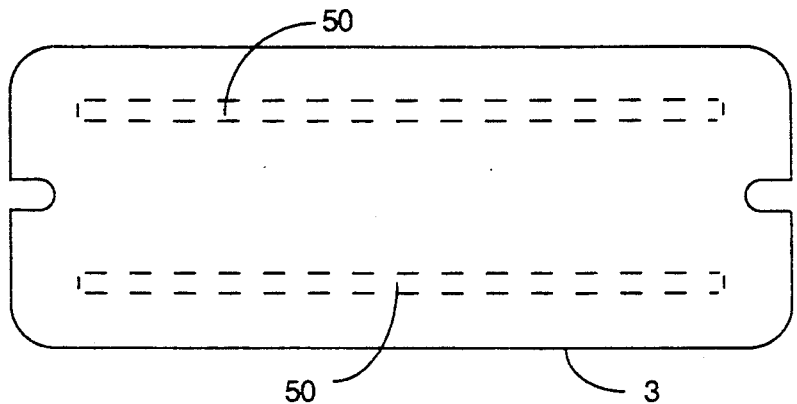
FIG. 8 shows a plan view of a display board of the present invention with a pair of strengthening rods in place.

To prevent the loss of rigidity and only moderately increasing the weight of display board 3, a stiffening rod 50 can be inserted between adjacent flutes or corrugations 45 along the top edge of display board 3 as shown in FIGS. 7 and 8. If display board 3 is particularly large, a second stiffening rod 50 may be inserted along the lower edge of display board 3. in still other applications, additional stiffening rods 50 may be necessary.

Stiffening rods 50 of a diameter or cross-sectional size and shape that is the same or slightly larger than the spacing between the flutes or corrugations 45 where it is to be placed serve the desired purpose best since they are less likely to fall out during use. It has also been discovered that stiffening rod 50 can be a round hardwood, hard plastic or steel dowel or rod. Thus, with stiffening rod 50 in place, the sagging, twisting and warping of display board 3 is minimized in high temperature and windy conditions.

Figure 9:
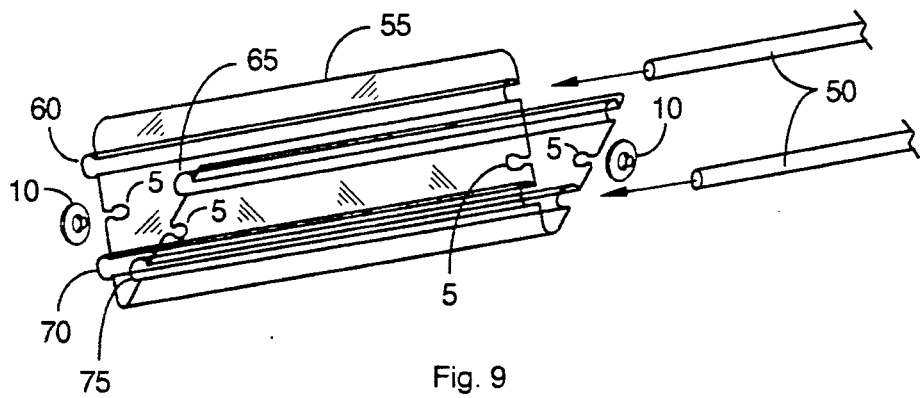
FIG. 9 is an exploded perspective view, of a second embodiment of the present invention.

FIG. 9 is an exploded perspective view of a second embodiment of the present invention. In this embodiment display board 3 as discussed above is replaced with board 55 that is a single piece of clear acetate, or similar material, that is vacuum formed to be self-snapping for closure when it is folded back on its self. More specifically, when board 55 is cut it is twice as high as the finished board needs to be so that it, when folded will form an enclosure for one or more stickers therewithin. When in the flat configuration snap channels 60-75 are vacuum formed with channels 60 and 70 formed horizontally to the outside of, and across the upper and lower edges of one side of board 55 being spaced apart from each other by at least a distance that is equal to the height of the desired sticker(s) to be displayed. Snap channels 65 and 75 are simultaneously formed horizontally to the inside of, and across the upper and lower edges of the other side of board 55 being spaced apart from each other by the same distance that snap channels 60 and 70 are spaced. Thus, when the desired stickers are in place, board 55 is folded horizontally so that channels 65 and 75 snap together with channels 60 and 70, respectively. Slots 5 are also cut along the vertical edges of board 55 through both thicknesses so that when suction cups 10 are inserted, they also assist in maintaining closure and retaining the stickers within board 55 if they where not adhesively affixed to the interior of board 55. Snap channels 60-75 are also sized and shaped to receive stiffening rods 50. Another feature of this embodiment of sticker display system is that two stickers may be inserted into board 55 before it is closed so that a different sticker is visible through each side of board 55. This allows the user to display a different sticker on the inside of a window form that displayed on the outside through the window in those situations where both sides of board 55 will be visible, or to have an alternative sticker available by merely reversing board 55 in other situations.

Figure 10:
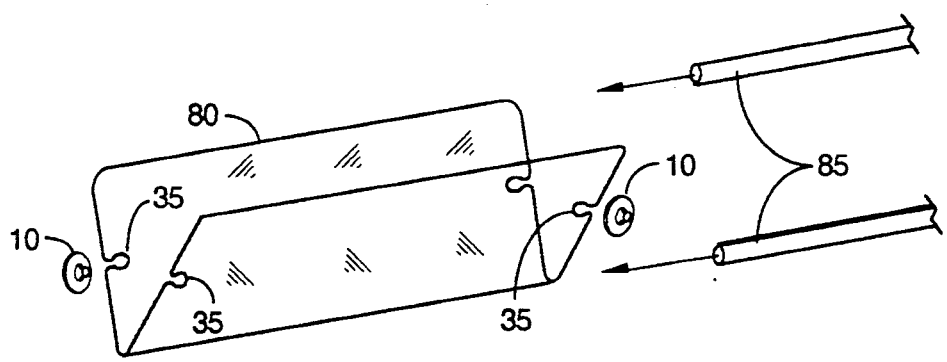
FIG. 10 is an exploded perspective view of a third embodiment of the present invention.

FIG. 10 shows a third embodiment of the present invention in an exploded perspective view. This embodiment includes a board 80 cut from a flat sheet of clear acetate, or similar material, that is folded in half to form display board 80. Slots 35 are then cut along the vertical edges through both thicknesses for receiving suction cups 10. To maintain closure and to provide support against sagging, warping and twisting in a high temperature environment, lengths of colored rim molding 85 can be slipped over the top and bottom edges of board 80. Being made of a clear material, this embodiment has the same advantages as does board 55 of FIG. 9.

Figure 11:
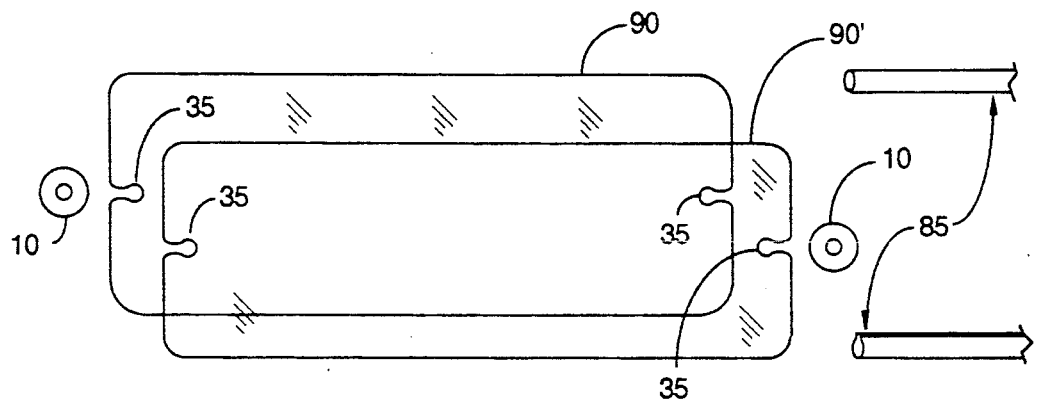
FIG. 11 is an exploded perspective view of a fourth embodiment of the present invention.

A fourth embodiment is shown in FIG. 11 also in an exploded perspective view. This embodiment is similar to the embodiment of FIG. 10 with board 80 being replaced by two separate boards 90 and 90' each from a sheet of clear acetate or similar material which provide the outside of the sandwich for the sticker display system. In this embodiment rim molding 85 is necessary when the sticker(s) are not adhesively mounted in the sticker display system.

Figure 12A:
FIGS. 12a-c are end views of different shapes of available rim molding.
Figure 12B:
Figure 12C:
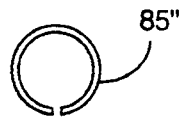

FIGS. 12a-c show the end views of three standard shapes of plastic rim molding 85, 85' and 85", that is commercially available.

Figure 13:
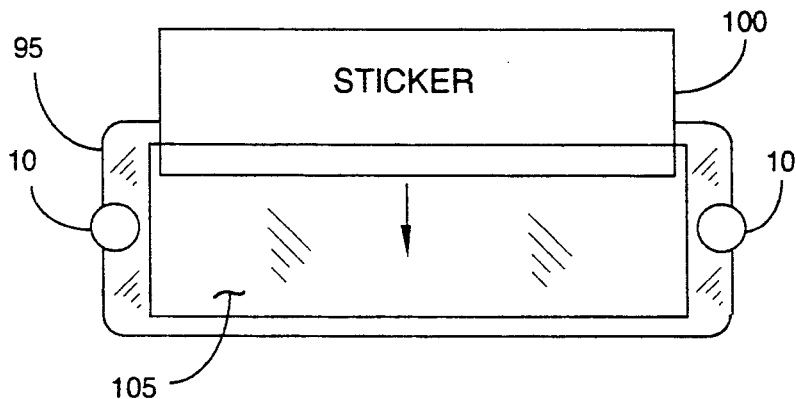
FIG. 13 is an exploded plan view of a fifth embodiment of the present invention.

FIG. 13 shows a fifth embodiment of the present invention which includes a frame 95 with a clear sheet of acetate, or similar material, adhering thereto along the bottom and side edges to form window 105 thereon for viewing a sticker 100 that is slipped into the sticker display system between frame 95 and a window 105. Here frame 95 is shown as being transparent, however, an opaque frame could also be used.

Figure 14:
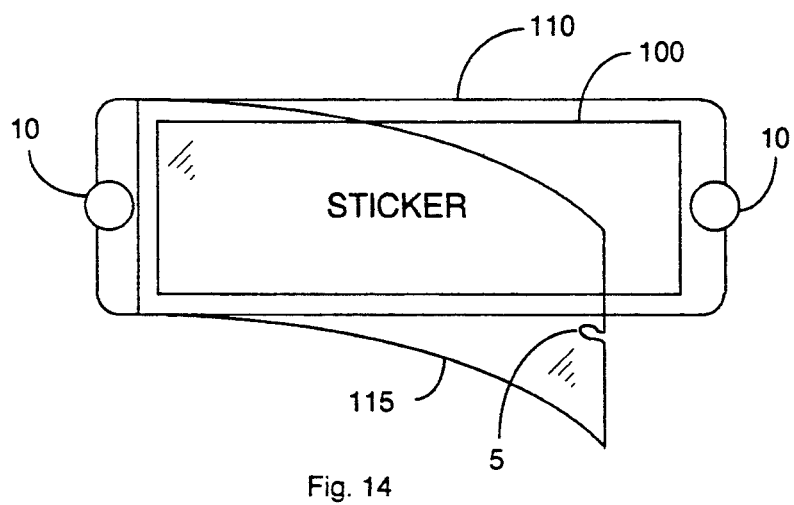
FIG. 14 an exploded plan view of a sixth embodiment of the present invention.

FIG. 14 shows a sixth embodiment of the present invention which includes display board 100 of a lightweight material with a transparent cover sheet 115 of acetate, or a similar material, mounted over it. This configuration is a combination of the display board 3 of the first embodiment and one of the sheets 90 of the fourth embodiment. In this configuration, sheet 115 is attached at one end to the vertical edge of board 110 and removably at the other end by shaft 17 of suction cups 10 capturing both board 110 and sheet 115.

The above described embodiments of the present invention are intended to be illustrative of numerous ways in which a sticker display system can be implemented, but not intended to be all inclusive of the many variations that these embodiments may suggest to one skilled in this art. The scope of the protection of the present invention is to only be limited by the scope and meaning of the following claims.

What is claimed is:

1. A sticker display system for temporary attachment to a surface on which or through which one or more stickers are to be displayed, said system comprises:
   display board means of a lightweight material geometrically sized and shaped to be at least as large as the sticker to be displayed for receiving a sticker for display, said display board means includes a flat piece of a corrugated material with flutes therewithin that are oriented to be substantially parallel to the upper and lower edges of the display board system;
   receptor means defined along the vertical geometric edges of said display board means;
   a pair of temporary mounting means for removably and repeatably supporting said display board means when mated with said receptor means in said display board means and affixed to the surface where the sticker is to be displayed; and
   stiffening means applied to the display board means for stiffening said display board means in situations where it would otherwise be subject to sagging, twisting or warping, said stiffening means includes at least one elongated rod of a cross-sectional size and shape that fits within the spacing between two adjacent flutes of the corrugated material for placement of each rod between adjacent pairs of said flutes.

2. A sticker display system of claim 1 wherein one of said at least one rods is placed between the corrugation flutes near the top edge of the flat piece of the display board.

3. A sticker display system of claim 1 wherein a second one of said at least one rods is placed between the corrugation flutes near the bottom edge of the flat piece of the display board.

4. A sticker display system for temporary attachment to a surface on which or through which one or more stickers are to be displayed, said system comprises:
   display board means of a lightweight material geometrically sized and shaped to be at least as large as the sticker to be displayed for receiving a sticker for display, said display board means includes;
     a flat piece of a corrugated material with flutes therewithin that are oriented to be substantially parallel to the upper and lower edges of the display board system; and
     a sheet of clear material sized and shaped to overlay said flat piece of material;
     both of said flat piece of material and said sheet of clear material defining slots along their vertical edges;
   a pair of temporary mounting means for removably and repeatably supporting said display board means when mated with said slots in said flat piece of material and said sheet of material of said display board means and affixed to the surface where the sticker is to be displaced and for holding said flat piece of material and said sheet of material of said display board means together; and
   stiffening means applied to the display board means for stiffening said display board means in situations where it would otherwise be subject to sagging, twisting or warping, said stiffening means includes at least one elongated rod of a cross-sectional size and shape that fits within the spacing between two adjacent flutes of the corrugated material for placement of each rod between adjacent pairs of said flutes.

5. A sticker display system of claim 4 wherein one of said at least one rods is placed between the corrugation flutes near the top edge of the flat piece of the display board.

6. A sticker display system of claim 4 wherein a second one of said at least one rods is placed between the corrugation flutes near the bottom edge of the flat piece of the display board.

7. A sticker display system for temporary attachment to a surface on which or through which one or more stickers are to be displayed, said system comprises:
   display board means of a lightweight material geometrically sized and shaped to be at least as large as the sticker to be displayed for receiving a sticker for display, said display board means includes a single piece of a clear material that is formed to be self-snapping for closure when it is folded back on its self, said single piece is twice as high as the finished sticker display system so that it forms an enclosure for one or more stickers therewithin when folded back on itself by snapping together opposingly formed snap channels in the upper half with mating snap channels in the lower half, one pair of snap channels are oriented horizontally to the outside of, and across the upper and lower edges of one half of display board means being spaced apart from each other by at least a distance that is equal to the height of the desired sticker to be displayed while the other pair of snap channels are oriented horizontally to the inside of, and across the upper and lower edges of the other half of display board means being spaced apart from each other by the same distance that the first pair of snap channels are spaced from each other;
   receptor means defined along the vertical geometric edges of said display board means;
   a pair of temporary mounting means for removably and repeatably supporting said display board means when mated with said receptor means in said display board means and affixed to the surface where the sticker is to be displayed; and
   stiffening means applied to the display board means for stiffening said display board means in situations where it would otherwise be subject to sagging, twisting or warping, said stiffening means includes at least one elongated rod of a cross-sectional size and shape that fits within the snap channels of the display board means;
   said snap channels also being sized and shaped to receive said stiffening means.

8. A sticker display system for temporary attachment to a surface on which or through which one or more stickers are to be displayed, said system comprises:
   display board means of a lightweight material geometrically sized and shaped to be at least as large as the sticker to be displayed for receiving a sticker for display, said display board means includes a single piece of a clear material that is a flat sheet of clear material that is folded in half to form said display board means, when folded said flat sheet defines slots along the vertical edges through both thicknesses;

a pair of temporary mounting means for removably and repeatably supporting said display board means when mated with said slots in said display board means and affixed to the surface where the sticker is to be displayed; and stiffening means applied to the display board means for stiffening said display board means in situations where it would otherwise be subject to sagging, twisting or warping, said stiffening means includes a pair of lengths of rim molding disposed to be slipped over the top and bottom edges of said display board means.

* * * * *